July 28, 1959 R. H. ZEILMAN 2,897,021
BALL BEARING
Filed Feb. 13, 1958 2 Sheets-Sheet 1

INVENTOR.
ROY H. ZEILMAN
BY
Oberlin & Limbach
ATT'YS

July 28, 1959     R. H. ZEILMAN     2,897,021
BALL BEARING

Filed Feb. 13, 1958     2 Sheets-Sheet 2

INVENTOR.
ROY H. ZEILMAN
BY Oberlin & Limbach
ATT'YS

United States Patent Office 2,897,021
Patented July 28, 1959

2,897,021

BALL BEARING

Roy H. Zeilman, Lorain, Ohio, assignor to The Thew Shovel Company, Lorain, Ohio, a corporation of Ohio Application February 13, 1958, Serial No. 714,974

13 Claims. (Cl. 308—199)

The present invention relates as indicated to a ball bearing and more particularly to a heavy duty ball bearing which is adapted for use as, for example, in connection with the turntables of derricks, cranes, power shovels, shovels, excavators, and like equipment. The present invention also relates to a novel form of ball spacer that is employed in such bearing and that embodies certain improvements over the spacers disclosed in my copending application, Serial No. 540,986, filed October 17, 1955, now Pat. No. 2,827,345, dated March 18, 1958, and in the copending applications of Ramon F. Wikoff et al., Ser. No. 660,595 and Oswald Von Mehren, Ser. No. 660,594 both filed on May 21, 1957.

In a ball bearing for equipment of the character referred to, the balls, as they pass through high load zones of the bearing, travel at differential speeds as compared with their normal speed whereby the balls are alternately crowded together and spread apart. Ball bearing manufacturers contend that the balls, as they successively enter the high load zones, tend to crowd together and conversely, as they leave the high load zones, tend to move apart. It is for this reason that in a conventional ball bearing the ball separator is made to permit the balls to thus crowd together and to separate as they enter and leave the more heavily loaded zones. The conventional separator must also be designed to prevent oppositely moving surfaces of adjacent balls from coming into contact with each other because the rubbing velocity of ball surfaces is twice that of the velocity of the driven ball race. Also, rubbing pressures between the balls would be considerable since with the "full" type of ball bearing, the balls would have to force themselves from the unloaded zone into the loaded zone with pressures exerted at the ball equators or points of highest surface speed.

In the previously mentioned copending applications various forms of ball spacers are disclosed for resiliently supporting the balls for crowding and spreading movement as they enter and leave the high load zones.

It is one primary object of the present invention to provide a ball bearing and spacers therefor in which the latter, inserted between successive balls, are of novel, simple, and efficient form to best perform their functions of permitting crowding together of the balls and of resilient spreading apart of the balls as they enter and leave high load zones of the bearing.

It is another object of this invention to provide a novel form of ball bearing in which the resiliently deformable spacers between successive balls constitute, in effect, a series of pumps that operate in the high load zones as the balls crowd together thereat to displace the grease or other lubricant in the bearing to points where it is picked up by the balls to insure proper lubrication.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 3:
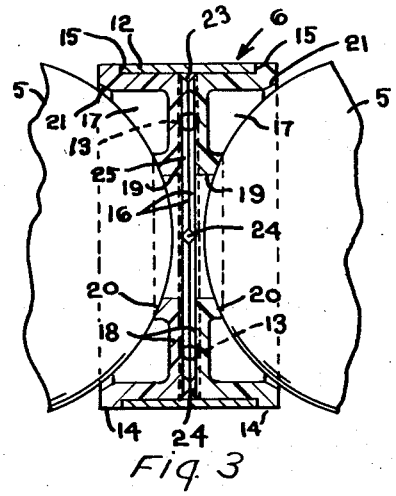
Fig. 3 is a cross-section view of one of the ball spacer assemblies showing the same in its normal condition operative to resiliently hold the adjacent balls in a predetermined spaced-apart relation.
Figure 7:
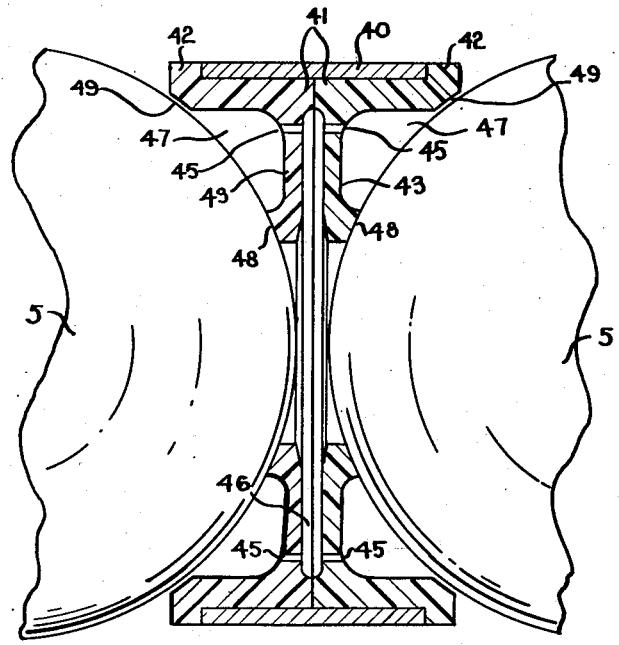
Figure 8:
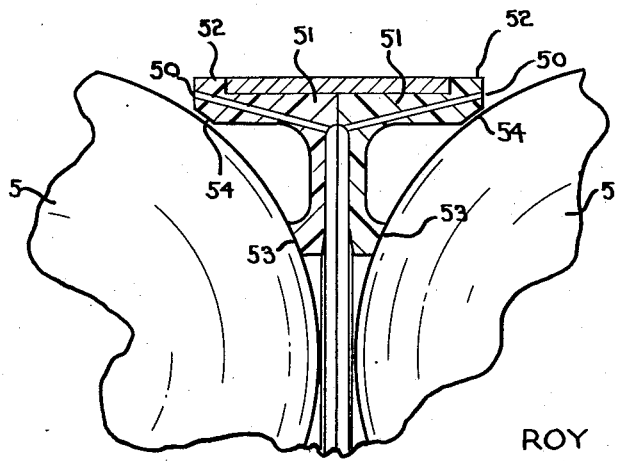

Fig. 7 is a cross-section view of a spacer assembly similar to that of Fig. 3 except provided with lubricant discharge passages for supplying lubricant onto the balls under the influence of pumping action of the spacer assembly as it is resiliently deformed by crowding action of the adjacent balls; and Fig. 8 is a cross-section view of a spacer assembly similar to those of Figs. 3 and 7 except that the lubricant discharge passages are arranged to supply lubricant to the adjacent balls at zones outward of the outer annular ball seats of the spacer assembly under the influence of pumping action as aforesaid.

Figure 1:
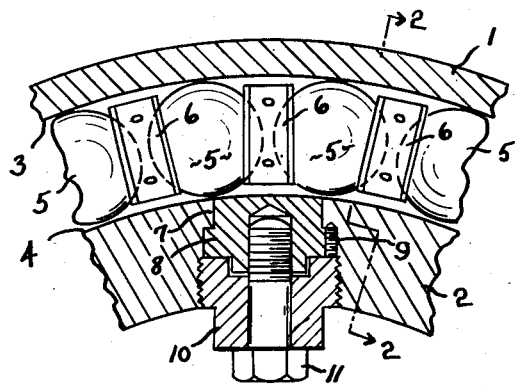
Fig. 1 is a fragmentary cross-section view of a portion of the present ball bearing, such section having been taken in a trans-axial plane through the middle of the bearing raceways.
Figure 2:
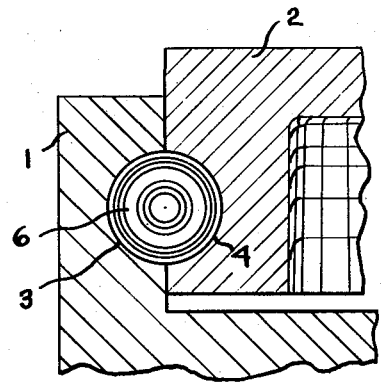
Fig. 2 is a fragmentary radial cross-section view of the bearing taken substantially along the line 2—2, Fig. 1.

Referring now in detail to the several figures of the drawing and first to Figs. 1 and 2, the ball bearing herein shown for purpose of illustration comprises an outer bearing member 1 and an inner bearing member 2 that are formed with complemental raceways 3 and 4 in which a series of balls 5 are disposed with spacers 6 therebetween. The inner member 2 is here shown as being formed with an opening 7 through which the balls 5 and spacers 6 may be loaded into the bearing, such opening being closed as by means of a plug 8 held against rotation by the key screw 9 and locked in place through a bushing 10 and bolt 11, as best shown in Fig. 1.

The inner and outer bearing members 1 and 2 are reasonably closely fitted together so as to retain lubricant, such as grease, in the bearing and, of course, sealing rings (not shown) may be employed to seal the lubricant in the annular space defined by the raceways 3 and 4. In the copending application of Wikoff et al., Serial No. 660,595, one sealing ring is shown and, obviously, a second sealing ring may be used to prevent leakage of lubricant from the annular bearing chamber defined by the raceways 3 and 4.

Figure 4:
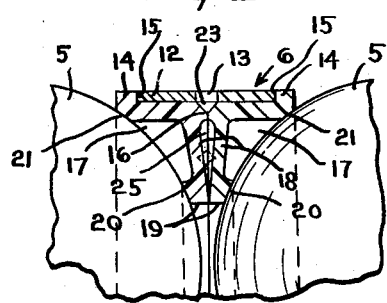
Fig. 4 is a cross-section view of the Fig. 3 spacer assembly in its resiliently deformed condition which it assumes under the crowding influence of the adjacent balls.

Referring now to the spacer 6 that is shown in elevation in Figs. 1 and 2, and in section in Figs. 3 and 4, the same comprises a strong metallic tubular housing 12 which may be formed with a plurality of circumferentially spaced openings 13 through the wall thereof approximately midway between the ends. Telescoped within said tubular housing 12 are a pair of oppositely facing resiliently deformable components 14 which are formed with annular shoulders 15 that abut the ends of the housing 12 and with axially extending annular ribs 16 that abut each other at the middle of the housing 12 and that, together with the annular recesses 17 on their outer faces, define resiliently deformable portions 18. The portions 18 are axially thickened around the center openings 19 to provide annular ball seats 20 for contacting the adjacent balls 5. The outer ends of the components 14 are formed with ball seats 21 that are concentric with seats 20 but axially offset so as to be out of contact with the balls 5 except when the balls are crowded together as in Fig. 4. By reason of the abutting relation of the components 14 with each other and with housing 12 the seats 21 are essentially non-yielding so as to constitute effective stops to prevent successive balls 5 from coming together into rubbing contact and to prevent over-compression at seats 20.

The outer edge of one or both ribs 16 may be chamfered as shown so as to define annular channel 23 which communicates with the aforesaid openings 13. The abutting annular ribs 16 may also, if desired, be formed with notches 24 or the like which form passages leading from the space 25 between the resiliently deformable portions 18 to the channel 23.

Said components 14 are preferably made of resiliently deformable material, it having been found that nylon is a well suited material because of its low coefficient of friction with the balls 5 and because of its relatively great strength and hardness to provide the resiliently deformable portions 18 that exert substantial spreading influence on the balls 5 and that are capable of being resiliently deformed under crowding action of the balls.

When the adjacent balls 5 crowd together as they pass through a high load zone of the bearing, the resiliently deformable portions 18 yield and under extreme conditions, the balls 5 come into contact with the outer ball seats 21, as best shown in Fig. 4. At this stage, the portions 18 also abut each other to supplement the stop function of the ball seats 21. It is to be noted that when the balls 5 do thus crowd together, as in Fig. 4, the volume of the space 25 is decreased, whereby the grease therein and in the central openings 19 is pumped or displaced either between the junction of components 14 or through the notches 24 when provided, channel 23, and openings 13 toward the bearing races 3 and 4 for pickup by the balls 5. When the bearing is filled with grease, the pumping action thus causes a circulation of the grease to maintain a film of grease on the balls 5 at all times, the grease being re-deposited from the ball surfaces by contact between the axially inner portions of the resilient portions 18 and the ball surfaces during operation in the no-load zone.

Figure 5:
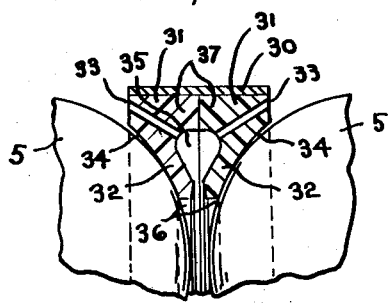
Fig. 5 is a cross-section view of another form of resilient spacer assembly in the position it assumes when the adjacent balls are in normally spaced-apart relation as when the bearing is operating at moderate or low load conditions.
Figure 6:
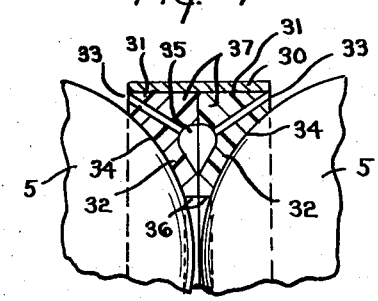
Fig. 6 is a cross-section view of the Fig. 5 spacer assembly in its resiliently deformed condition with adjacent balls crowded together.

Referring now to Figs. 5 and 6, the spacer therein shown is of different form comprising a rigid tubular housing 30 in which abutting resiliently deformable components 31 (as of nylon) are disposed. In this case, the resiliently deformable portions 32 are formed with ball contacting surfaces 34 of which only the inner corners initially engage the balls 5 as shown in Fig. 5 and which, during yielding under the crowding action of the balls, progressively contact the balls 5 in wider surface contact until the Fig. 6 condition exists to arrest further crowding movement of the balls.

Preferably, the resiliently deformable portions 32 are arranged so that they come together into abutting contact, as in Fig. 6, prior to the time that the balls 5 come into rubbing contact with each other. In this case, the resiliently deformable components 31 may be formed with passages 33 through which the lubricant in recess 35 and in the central openings 36 is pumped or displaced directly on to the balls 5 at zones opposite the seats 34 or outward of the seats 34. Alternatively, the pumping arrangement may be like that of the Fig. 3 spacer i.e., the abutting annular ribs 37 may be notched, as in Fig. 3, and may be formed to define a channel therearound which communicates with openings formed through the housing 30.

The form of spacer assembly illustrated in Fig. 7 is much like that in Fig. 3 except that the tubular housing 40 is preferably imperforate as are the abutting annular ribs 41 of the components 42. The resiliently deformable portions 43 are formed with passages 45 which are effective to cause the discharge of lubricant pumped from the chamber 46 directly into the recess 47 between the concentric, axially offset ball seats 48 and 49.

Finally, with reference to Fig. 8, the spacer there shown is again like Fig. 3 and also Fig. 7 except that the lubricant discharge passages 50 are formed in the skirts 51 of the resiliently deformable components 52 to supply the pumped lubricant to the balls 5 outward of the concentric, axially offset ball seats 53 and 54 and also to the raceways 3 and 4.

The several forms of the invention herein disclosed are each characterized in the provision of a ball bearing spacer that has inwardly extending, annular, resiliently deformable portions of nylon or like material, and that has stops to rather positively arrest the crowding action of the balls before they come together into rubbing contact. The stops are arranged to come into effect while the flexing of the resiliently deformable portions is within the elastic limits, whereby said portions promptly restore the balls to spread apart relation as they leave the highly loaded zones of the bearing. Furthermore, each spacer herein, as the balls enter the high load zone and are crowded together, operates as a pump and is provided with lubricant discharge passages to supply the lubricant displaced thereby onto the ball surfaces and/or onto the raceways.

Other modes of applying the principle of the invention may be employed, change being made as regards the details described, provided the features stated in any of the following claims, or the equivalent of such, be employed.

I therefore particularly point out and distinctly claim as my invention:

1. A ball bearing spacer comprising a rigid tubular housing, and a ball-contacting component in said housing, said component having an annular peripheral portion that is substantially inflexible in an axial direction and having inwardly extending, axially spaced apart annular spring portions that are resiliently deformable in an axial direction and that form an annular cavity therebetween, the opposite faces of said spring portions being formed with ball contacting surfaces that move axially toward each other as said spring portions yield under the influence of crowding action of adjacent balls, and the opposite faces of said peripheral portion also being formed with ball contacting surfaces which limit the extent of crowding action of adjacent balls.

2. The spacer of claim 1 wherein said spring portions abut each other at about the same time that the balls contact the ball contacting surfaces of said peripheral portion.

3. The spacer of claim 1 wherein said component is formed with opposite annular recesses between the ball contacting surfaces of said spring portions and said peripheral portion.

4. The spacer of claim 1 wherein the ball contacting surfaces of said spring portions and peripheral portion are axially offset.

5. The spacer of claim 1 wherein the ball contacting surfaces of said spring portions and peripheral portion are generally spherical but of radius such that only the surfaces of said spring portions initially contact the adjacent balls.

6. The spacer of claim 1 characterized further in that it is formed with passages therethrough leading from said cavity whereby, upon yielding movement of said spring portions, grease in said cavity is pumped through said passages.

7. The spacer of claim 6 wherein said passages extend radially through said peripheral portion and through said housing.

8. The spacer of claim 6 wherein said passages extend through said peripheral portions radially outward of the ball contacting surfaces thereof.

9. The spacer of claim 6 wherein said passages extend through said spring portions between the ball contacting surfaces of said peripheral portion and said spring portions.

10. A spacer for balls of a ball bearing assembly in which the balls are subjected to high strains and compressive forces, comprising a pump element including a pair of axially spaced annular spring members having circular sealing surfaces for wiping and bearing engagement with the surface of an adjacent ball as the ball rotates relative to said spacer, said surfaces being disposed at the radially inner, axially outer part of each of said spring members, relatively rigid body means at the outer peripheral areas of said spring members to retain them in spaced relationship against substantial movement toward one another at said outer peripheral areas, said relatively rigid body means and said spring members defining a grease-retaining cavity therebetween, said cavity constituting a pump chamber of variable volume upon resistive movement of said spring members in an axially inwardly direction under compressive action of adjacent balls, and grease conducting passages formed in the spacer for controlled disposal of grease from said cavity to the surface of adjacent balls upon such compressive action to maintain said balls in constantly lubricated condition.

11. A spacer as set forth in claim 10 wherein said grease conducting passages are formed in said body means, one end of said passages opening into said cavity and the other end thereof opening into a space outside of the spacer and traversed by the surface of the adjacent ball as it rotates.

12. A spacer as set forth in claim 10 wherein said grease conducting passages extend radially outward from said cavity and through said body means to conduct grease displaced from said cavity to the raceways of the ball bearing assembly.

13. A spacer as set forth in claim 10 wherein said grease conducting passages extend through said spring members from said cavity to conduct grease displaced from said cavity to the adjacent balls at zones radially outward of said sealing surfaces.

References Cited in the file of this patent

UNITED STATES PATENTS

| | | |
|---|---|---|
| 860,186 | Beemer | July 16, 1907 |
| 1,220,616 | Englerth | Mar. 27, 1917 |